(12) United States Patent
Lee et al.

(10) Patent No.: US 8,973,372 B2
(45) Date of Patent: *Mar. 10, 2015

(54) COMBUSTOR SHELL AIR RECIRCULATION SYSTEM IN A GAS TURBINE ENGINE

(75) Inventors: Ching-Pang Lee, Cincinnati, OH (US); Evan C. Landrum, Charlotte, NC (US); Jiping Zhang, Winter Springs, FL (US)

(73) Assignee: Siemens Aktiengesellschaft, München (DE)

( * ) Notice: Subject to any disclaimer, the term of this patent is extended or adjusted under 35 U.S.C. 154(b) by 347 days.

This patent is subject to a terminal disclaimer.

(21) Appl. No.: 13/603,699

(22) Filed: Sep. 5, 2012

(65) Prior Publication Data

US 2014/0060082 A1    Mar. 6, 2014

(51) Int. Cl.
| | |
|---|---|
| *F01D 25/12* | (2006.01) |
| *F02C 3/30* | (2006.01) |
| *F02C 3/04* | (2006.01) |
| *F01D 21/00* | (2006.01) |
| *F01D 25/14* | (2006.01) |
| *F02C 6/08* | (2006.01) |
| *F02C 7/18* | (2006.01) |

(52) U.S. Cl.
CPC . *F02C 3/04* (2013.01); *F01D 21/00* (2013.01); *F01D 25/14* (2013.01); *F02C 6/08* (2013.01); *F02C 7/18* (2013.01)
USPC .......... 60/782; 60/779; 60/785; 60/795; 60/39.3; 60/39.53; 415/108; 415/144; 415/116

(58) Field of Classification Search
CPC ......... F01D 25/12; F01D 25/26; F01D 25/08; F05D 2260/205
USPC .......... 60/779, 782, 785, 795, 775, 39.3, 60/39.53; 415/108, 144, 116
See application file for complete search history.

(56) References Cited

U.S. PATENT DOCUMENTS

| | | | |
|---|---|---|---|
| 5,172,553 A | 12/1992 | Barton et al. | |
| 5,394,687 A | 3/1995 | Chen et al. | |
| 5,953,900 A * | 9/1999 | Bannister et al. | ............... 60/775 |
| 6,478,534 B2 | 11/2002 | Bangert et al. | |
| 6,779,346 B2 * | 8/2004 | Nichols et al. | .................. 60/782 |
| 7,329,084 B2 | 2/2008 | Dittmann et al. | |
| 7,682,130 B2 | 3/2010 | Jurjevic | |
| 7,766,610 B2 | 8/2010 | Busekros et al. | |
| 7,798,767 B2 | 9/2010 | Kondo et al. | |
| 7,987,660 B2 | 8/2011 | Iwasaki et al. | |

(Continued)

FOREIGN PATENT DOCUMENTS

| | | |
|---|---|---|
| DE | 507129 C | 9/1930 |
| DE | 102006024968 A1 | 3/2006 |
| JP | 2004052567 A | 2/2004 |

*Primary Examiner* — Phutthiwat Wongwian
*Assistant Examiner* — Steven Sutherland

(57) ABSTRACT

A shell air recirculation system for use in a gas turbine engine includes one or more outlet ports located at a bottom wall section of an engine casing wall and one or more inlet ports located at a top wall section of the engine casing wall. The system further includes a piping system that provides fluid communication between the outlet port(s) and the inlet port(s), a blower for extracting air from a combustor shell through the outlet port(s) and for conveying the extracted air to the inlet port(s), and a valve system for selectively allowing and preventing air from passing through the piping system. The system operates during less than full load operation of the engine to circulate air within the combustor shell but is not operational during full load operation of the engine.

18 Claims, 3 Drawing Sheets

(56) References Cited

U.S. PATENT DOCUMENTS

| | | |
|---|---|---|
| 8,087,251 B2 | 1/2012 | Iwasaki et al. |
| 2004/0228723 A1 | 11/2004 | Dittmann et al. |
| 2006/0073010 A1 | 4/2006 | Busekros et al. |
| 2009/0056342 A1 | 3/2009 | Kirzhner |
| 2010/0068035 A1 | 3/2010 | Roush et al. |
| 2010/0189551 A1 | 7/2010 | Ballard, Jr. et al. |
| 2014/0060068 A1* | 3/2014 | Lee et al. .................. 60/775 |

* cited by examiner

COMBUSTOR SHELL AIR RECIRCULATION SYSTEM IN A GAS TURBINE ENGINE

FIELD OF THE INVENTION

The present invention relates to a combustor shell air recirculation system in a gas turbine engine, wherein the recirculation system is operable during less than full load operation to create a more uniform air temperature distribution within the combustor shell.

BACKGROUND OF THE INVENTION

During operation of a gas turbine engine, air is pressurized in a compressor section then mixed with fuel and burned in a combustion section to generate hot combustion gases. In a can annular gas turbine engine, the combustion section comprises an annular array of combustor apparatuses, sometimes referred to as "cans" or "combustors", which each supply hot combustion gases to a turbine section of the engine where the hot combustion gases are expanded to extract energy therefrom to provide output power, which is in turn used to produce electricity.

SUMMARY OF THE INVENTION

In accordance with the present invention, a gas turbine engine is provided including a longitudinal axis defining an axial direction of the engine. The engine comprises a compressor section where air pulled into the engine is compressed, a combustion section comprising a plurality of combustor apparatuses where fuel is mixed with at least a portion of the compressed air from the compressor section and burned to create hot combustion gases, and a turbine section where the hot combustion gases from the combustion section are expanded to extract energy therefrom. The engine further comprises a casing having a portion disposed about the combustion section, the casing portion comprising a casing wall having a top wall section defining a top dead center, left and right side wall sections, and a bottom wall section defining a bottom dead center. The casing portion further defines an interior volume in which the combustor apparatuses and air compressed by the compressor section are located. The engine additionally comprises a shell air recirculation system.

According to a first aspect of the present invention, the shell air recirculation system comprises at least one outlet port located at the bottom wall section of the casing wall and first and second inlet ports located at the top wall section of the casing wall. The inlet ports are circumferentially spaced apart from one another and are located at generally the same axial location. The shell air recirculation system further comprises a piping system that provides fluid communication between the at least one outlet port and the inlet ports, a blower for extracting air from the interior volume of the casing portion through the at least one outlet port and for conveying the extracted air to the inlet ports, and a valve system for selectively allowing and preventing air from passing through the piping system. During a first mode of engine operation, at least some of the air in the interior volume of the casing portion is introduced into the combustor apparatuses for being burned with fuel to create hot combustion gases, and the valve system substantially prevents air from passing through the piping system. During a second mode of engine operation, the valve system allows air to pass through the piping system such that at least a portion of the air in the interior volume of the casing portion is extracted from the at least one outlet port by the blower and conveyed by the blower to the inlet ports for injection into the top wall section of the casing wall.

According to a second aspect of the present invention, the shell air recirculation system comprises at least one outlet port located at the bottom wall section of the casing wall and at least one inlet port located at the top wall section of the casing wall. The shell air recirculation system further comprises a piping system that provides fluid communication between the at least one outlet port and the at least one inlet port, a blower for extracting air from the interior volume of the casing portion through the at least one outlet port and for conveying the extracted air to the at least one inlet port, and a valve system for selectively allowing and preventing air from passing through the piping system. During a first mode of engine operation, at least some of the air in the interior volume of the casing portion is introduced into the combustor apparatuses for being burned with fuel to create hot combustion gases, and the valve system substantially prevents air from passing through the piping system. During a second mode of engine operation, the valve system allows air to pass through the piping system such that at least a portion of the air in the interior volume of the casing portion is extracted from the at least one outlet port by the blower and conveyed by the blower to the at least one inlet port. The at least one inlet port is configured such that the air injected thereby flows from the top wall section of the casing wall down the left and right side wall sections of the casing wall toward the bottom wall section of the casing wall.

According to a third aspect of the present invention, the combustion section comprises a can annular combustion section comprising an annular array of combustor apparatuses. The shell air recirculation system according to this embodiment comprises at least one outlet port located at the bottom wall section of the casing wall and at least one inlet port located at the top wall section of the casing wall. At least one of the outlet and inlet ports also functions as a steam augmentation pipe to introduce high pressure steam into the interior volume of the casing portion during a first mode of operation. The shell air recirculation system further comprises a piping system that provides fluid communication between the at least one outlet port and the at least one inlet port, a blower for extracting air from the interior volume of the casing portion through the at least one outlet port and for conveying the extracted air to the at least one inlet port, and a valve system for selectively allowing and preventing air from passing through the piping system. During the first mode of engine operation, at least some of the air in the interior volume of the casing portion is introduced into the combustor apparatuses for being burned with fuel to create hot combustion gases, and the valve system substantially prevents air from passing through the piping system. During a second mode of engine operation, the valve system allows air to pass through the piping system such that at least a portion of the air in the interior volume of the casing portion is extracted from the at least one outlet port by the blower and conveyed by the blower to the at least one inlet port for injection into the top section of the casing wall.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
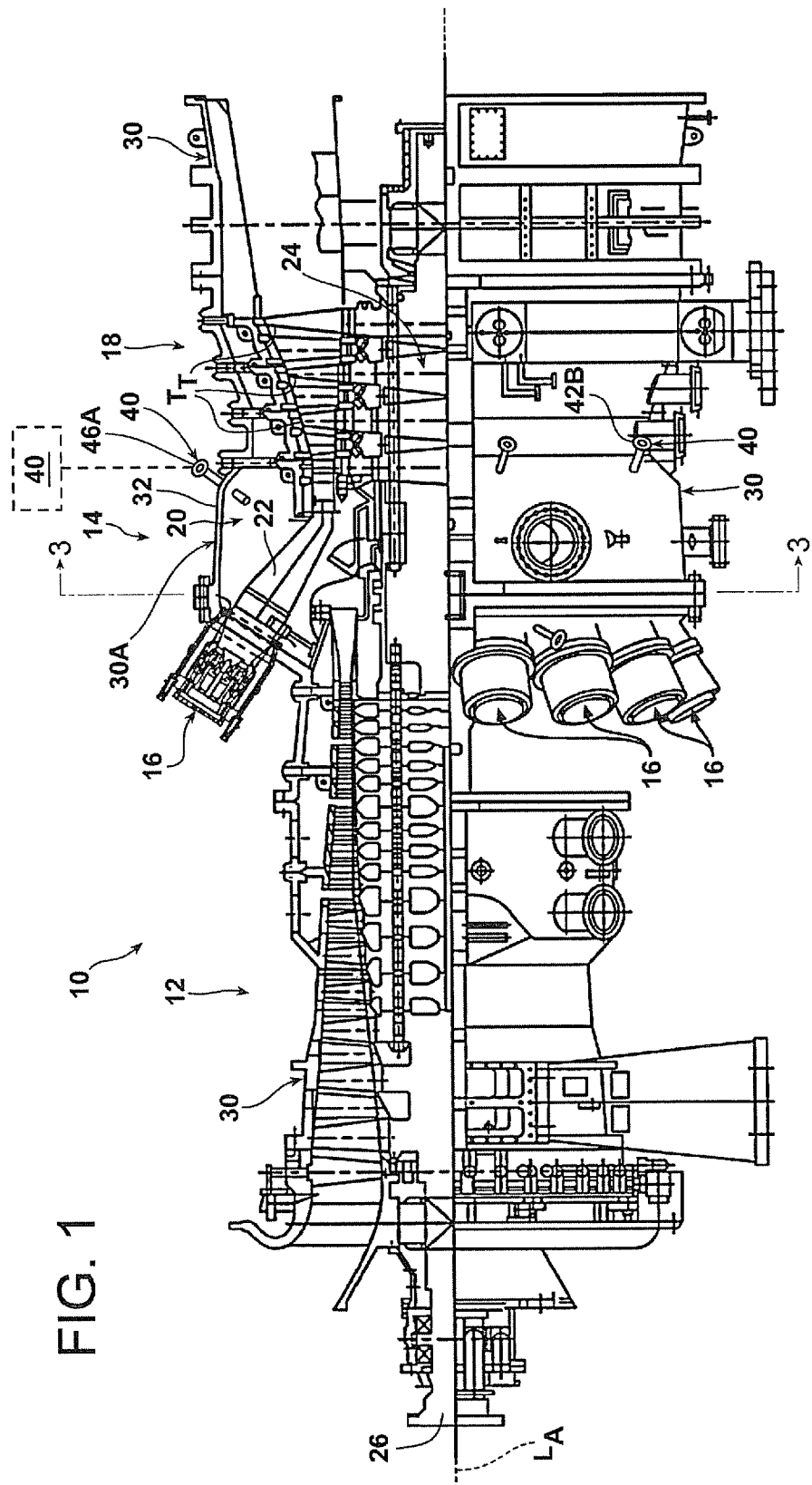
FIG. 1 is a side view, partially in section, of a gas turbine engine including a combustor shell air recirculation system according to an embodiment of the invention.

Referring to FIG. 1, a gas turbine engine 10 constructed in accordance with the present invention is shown. The engine 10 includes a compressor section 12, a combustion section 14 including a plurality of combustors 16, also referred to herein as "combustor apparatuses," and a turbine section 18. It is noted that only one combustor 16 is illustrated in FIG. 1 for clarity, but the engine 10 according to the present invention preferably comprises an annular array of combustors 16 that are disposed about a longitudinal axis $L_A$ of the engine 10 that defines an axial direction within the engine 10. Such a configuration is typically referred to as a "can-annular combustion system".

The compressor section 12 inducts and pressurizes inlet air, at least a portion of which is directed to a combustor shell 20 for delivery to the combustors 16. The air in the combustor shell 20 is hereinafter referred to as "shell air". Other portions of the pressured air may be extracted from the compressor section 12 to cool various components within the engine 10.

Upon entering the combustors 16, the compressed air from the compressor section 12 is mixed with fuel and ignited to produce high temperature combustion gases flowing in a turbulent manner and at a high velocity within the respective combustor 16. The combustion gases in each combustor 16 then flow through a respective transition duct 22 to the turbine section 18 where the combustion gases are expanded to extract energy therefrom. The energy extracted from the combustion gases is used provide rotation of a turbine rotor 24, which extends parallel to a rotatable shaft 26 that extends axially through the engine 10.

Figure 2:
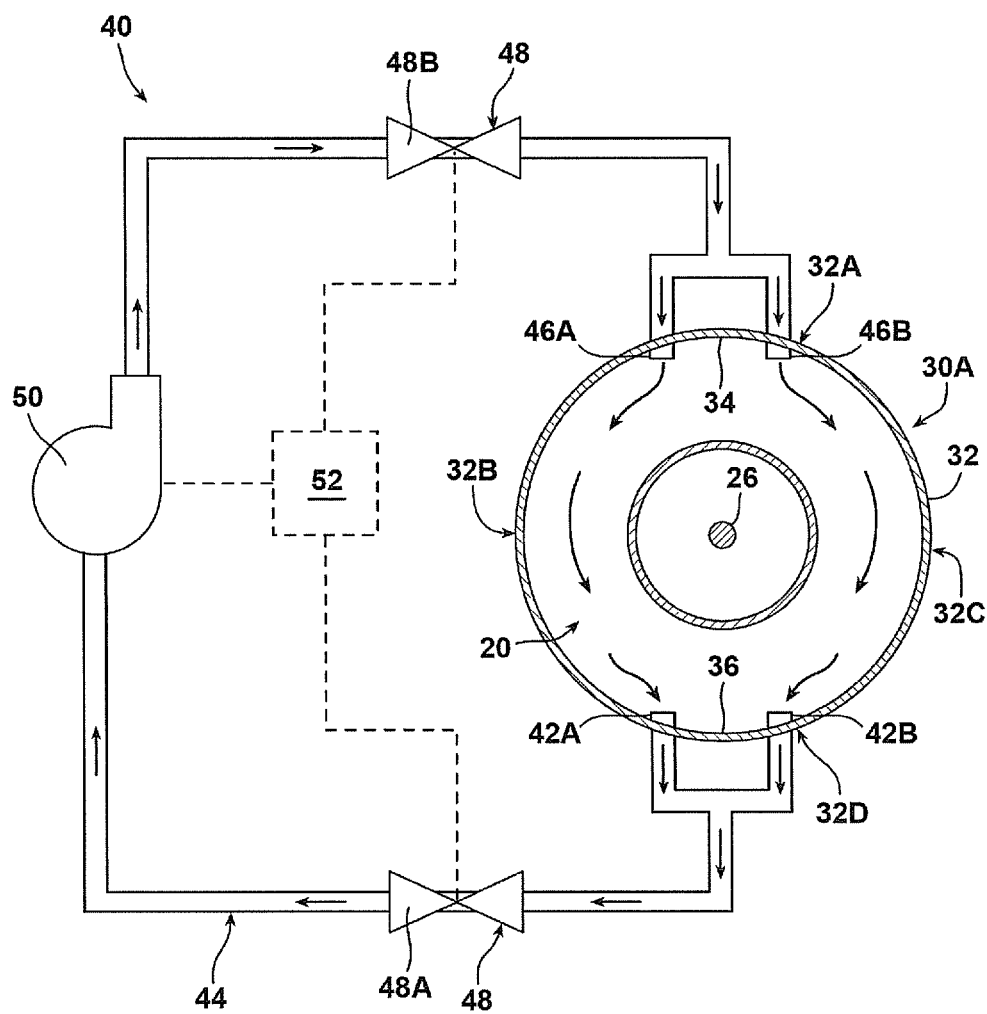
FIG. 2 is a schematic illustration of the combustor shell air recirculation system illustrated in FIG. 1.

As shown in FIG. 1, an engine casing 30 is provided to enclose the respective engine sections 12, 14, 18. A portion 30A of the casing 30 disposed about combustion section 14 comprises a casing wall 32 that defines the combustor shell 20, i.e., the combustor shell 20 defines an interior volume within the casing portion 30A. Referring to FIG. 2, the casing wall 32 includes a top wall section 32A, left and right side wall sections 32B, 32C, and a bottom wall section 32D. The top wall section 32A defines a top dead center 34 of the casing wall 32, which comprises an uppermost area of the casing portion 30A, and the bottom wall section 32D defines a bottom dead center 36 of the casing wall 32, which comprises a lowermost area of the casing portion 30A.

A shell air recirculation system 40 according to an aspect of the present invention will now be described. Referring to FIG. 2, the shell air recirculation system 40 in the embodiment shown comprises first and second outlet ports 42A, 42B located at the bottom wall section 32D of the casing wall 32. While the shell air recirculation system 40 according to this embodiment comprises first and second outlet ports 42A, 42B, any suitable number of outlet ports can be provided, including a single outlet port.

As shown in FIG. 2, the outlet ports 42A, 42B are circumferentially spaced apart and are located at generally the same axial location, wherein the bottom dead center 36 of the casing wall 32 is located between the outlet ports 42A, 42B. According to one aspect of the invention, at least one of the outlet ports 42A, 42B may also function as a steam augmentation pipe to channel high pressure steam into the combustor shell 20 to effect an increase in output power of the engine 10, i.e., by effecting higher combustion gas flow rates through turbine section 18.

The shell air recirculation system 40 further comprises a piping system 44 that is provided to convey shell air that is extracted from the combustor shell 20 through the outlet ports 42A, 42B to first and second inlet ports 46A, 46B, which are located at the top wall section 32A of the casing wall 32. While the shell air recirculation system 40 according to this embodiment comprises first and second inlet ports 46A, 46B, any suitable number of inlet ports can be provided, including a single inlet port.

As shown in FIG. 2, the inlet ports 46A, 46B are circumferentially spaced apart and are located at generally the same axial location, wherein the first inlet port 46A is located near the left side wall section 32B of the casing wall 32 and the second inlet port 46B is located near the right side wall section 32C of the casing wall 32. According to one aspect of the invention, at least one of the inlet ports 46A, 46B may also function as a steam augmentation pipe to channel additional high pressure steam into the combustor shell 20.

The shell air recirculation system 40 still further comprises a valve system 48 comprising first and second valves 48A, 48B in the embodiment shown, and a blower 50. The valve system 48 and the blower 50 are controlled by a controller 52 to selectively allow or prevent shell air from passing through the piping system 44 from the outlet ports 42A, 42B to the inlet ports 46A, 46B, as will be described in detail below. The blower 50 is provided for extracting the shell air from the combustor shell 20 through the outlet ports 42A, 42B and for conveying the extracted shell air to the inlet ports 46A, 46B when the valve system 48 is open.

A method for utilizing the shell air recirculation system 40 will now be described. During normal operation of the engine 10, also known as full load or base load operation and also referred to herein as a first mode of engine operation, the first and second valves 48A, 48B are closed and the blower 50 is turned off or is otherwise not operational. Hence, the valve system 48 substantially prevents shell air from passing through the piping system 44. At least a portion of the shell air is provided into the combustors 16 to be burned with fuel as discussed above. Additional portions of the shell air may be used to cool various components within the engine 10, as will be apparent to those having skill in the art.

Upon initiation of a turn down operation, which is implemented to transition the engine 10 to a shut down state or a turning gear state, fuel and shell air supplied to the combustors 16 is gradually ceased, such that the production of high temperature combustion gases in the combustors 16 is gradually decreased to null upon the engine 10 being transitioned to the shut down state or the turning gear state. Once combustion gases are no longer produced in the combustors 16, rotation of the turbine rotor 24 is not able to be effected by combustion gases. In such a situation, slow rotation of the turbine rotor 24 may be effected by an outside power supply (not shown), such as by a start-up motor, in an operating state referred to herein as a turning gear state. Alternatively, rotation of the turbine rotor 24 may be completely stopped in an operating state referred to herein as a shut down state. In a typical engine 10, such a turn down operation may take at least about 10-15 minutes to completely transition the engine 10 to a turning gear state, during which time combustion of a gradually decreasing level continues in the combustors 16 to produce high temperature combustion gases, which gases are conveyed into the turbine section 18 to provide rotation of the turbine rotor 24. The second mode of engine operation, as used herein, is meant to encompass turn down operation, a turning gear state, or a shut down state of the engine 10.

According to an aspect of the present invention, upon the initiation of a turn down operation to transition the engine 10 to either a turning gear state or a shut down state, the controller 52 opens the first and second valves 48A, 48B such that the valve system 48 allows air to pass through the piping system 44. The blower 50 is turned on by the controller 52 during the second mode of operation to extract shell air from the bottom wall section 32D of the casing wall 32 through the outlet ports 42A, 42B. The blower 50 conveys, i.e., pumps, the extracted shell air through the piping system 44 such that the extracted shell air is injected into the top wall section 32A of the casing wall 32 through the inlet ports 46A, 46B.

According to another aspect of the invention, the turn down operation may be implemented to transition the engine 10 from full load operation to a turning gear state, which may be run for a predetermined time or until one or more select engine components reaches a predefined temperature, at which point the engine 10 may be transitioned to a shut down state. Under this arrangement, during the turning gear state, the valves 48A, 48B are maintained in open positions and operation of the blower 50 is continued to extract shell air from the bottom wall section 32D of the casing wall 32 through the outlet ports 42A, 42B, to convey the extracted shell air through the piping system 44, and to inject the extracted shell air into the top wall section 32A of the casing wall 32 through the inlet ports 46A, 46B. However, upon the engine 10 entering the shut down state, i.e., after completion of the turning gear state, the blower 50 may be turned off or otherwise disabled to stop the pumping of shell air through the piping system 44. During the shut down state, the valves 48A, 48B may remain opened or the controller 52 may close them, but they would be closed by the controller 52 upon the initiation of an engine start up procedure.

As shown in FIG. 2, the air injected by the inlet ports 46A, 46B into the combustor shell 20 flows from the top wall section 32A of the casing wall 32 down the respective left and right side wall sections 32B, 32C toward the bottom wall section 32D. The shell air recirculation system 40 thus functions to circulate the shell air within the combustor shell 20 during less than full load operation so as to create a more uniform shell air temperature distribution within the combustor shell 20. Otherwise, hotter shell air would tend to migrate to the top wall section 32A, thus resulting in hotter temperatures at the top wall section 32A than at the bottom wall section 32D. Further, the shell air toward the bottom wall section 32D that is extracted through the outlet ports 42A, 42B by the blower 50 and injected through the inlet ports 46A, 46B is generally cooler than the shell air toward the top wall section 32A, thus resulting in an even more uniform shell air temperature distribution within the combustor shell 20.

The more uniform shell air temperature distribution within the combustor shell 20 effected by the shell air recirculation system 40 is believed to reduce or prevent issues that might result from components within and around the combustor shell 20 thermally growing at different rates, such as distortion of the engine casing 30 and/or rubbing of turbine blade tips $T_T$ in the turbine section 18 against the casing 30, thus lengthening a lifespan of these components and maintaining a tight blade tip clearance during full load operation for improved turbine efficiency. It is noted that since the shell air recirculation system 40 according to the present invention injects only shell air into the combustor shell 20, which shell air is extracted from the bottom wall section 32D through the outlet ports 42A, 42B by the blower 50, the cost and complexity of the shell air recirculation system 40 is reduced, i.e., compared to a system that uses structure such as an ejector to inject highly pressurized air into the combustor shell 20.

As noted above, one or more of the outlet and inlet ports 42A, 42B, 46A, 46B may also function as steam augmentation pipes to channel high pressure steam into the combustor shell 20 to effect an increase in output power of the engine 10. Such steam introduction is typically only performed during full load operation. If any of the outlet and inlet ports 42A, 42B, 46A, 46B also function as steam augmentation pipes, these ports 42A, 42B, 46A, 46B preferably extend straight into the casing wall 32 and terminate a short distance into the combustor shell 20, as shown in FIGS. 1 and 2. Using the outlet and inlet ports 42A, 42B, 46A, 46B as steam augmentation pipes may be especially advantageous if the shell air recirculation system 40 is implemented in an existing engine 10, i.e., in a retrofit design, as additional pipes that extend through the casing wall 32 would not be required, thus reducing the complexity of installing the shell air recirculation system 40 in an existing engine 10.

Figure 3:
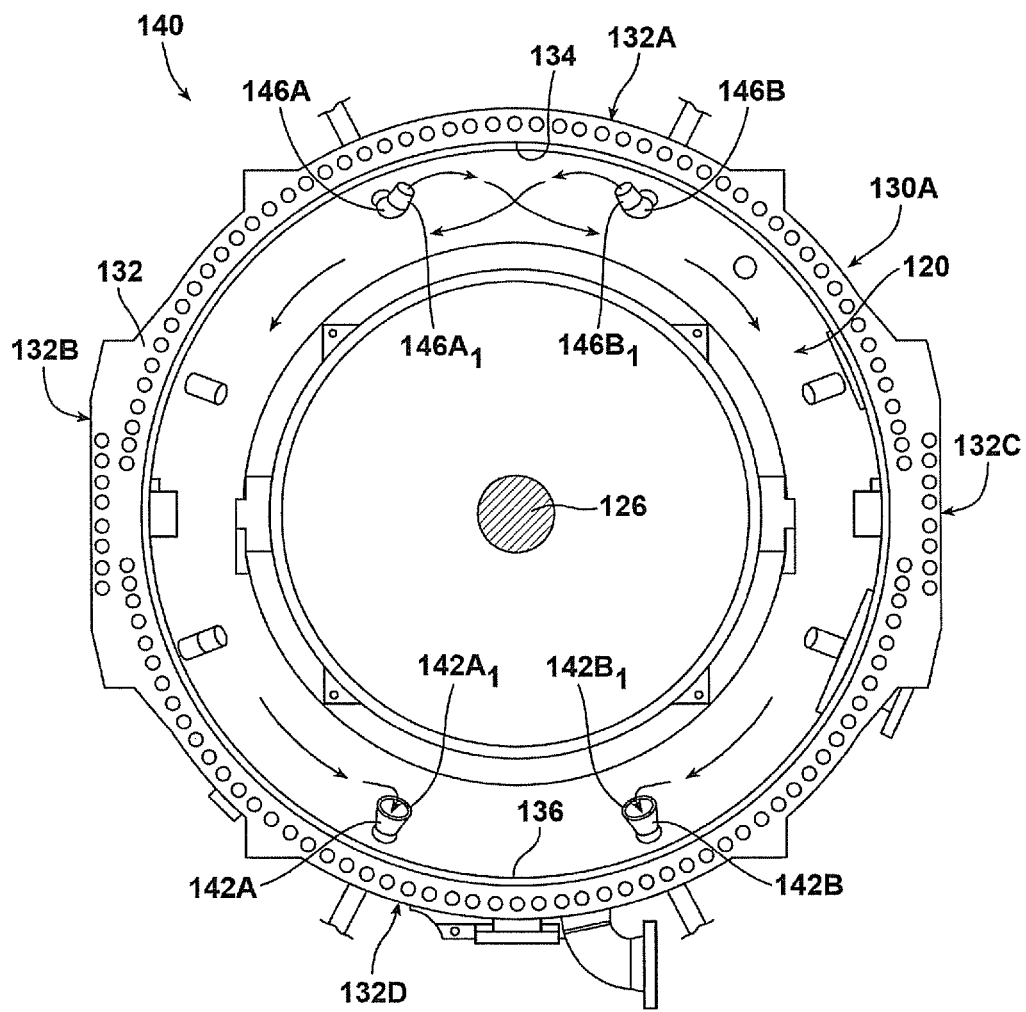
FIG. 3 is a sectional view of a portion of a combustor shell air recirculation system according to another aspect of the invention.

If the outlet and inlet ports 42A, 42B, 46A, 46B are not to function as steam augmentation pipes, one or more of these ports 42A, 42B, 46A, 46B could have specially configured tips to modify shell air extraction and/or injection from and/or into the combustor shell 20. For example, referring to FIG. 3, a shell air recirculation system 140 constructed in accordance with another embodiment of the invention is shown, wherein structure similar to that described above with reference to FIGS. 1 and 2 includes the same reference number increased by 100. Further, only structure that differs from the embodiment discussed above with reference to FIGS. 1 and 2 will be discussed herein for FIG. 3. As a point of reference, the view of the shell air recirculation system 140 shown in FIG. 3 is taken along line 3-3 illustrated in FIG. 1, and select engine 110 and shell air recirculation system 140 components have been removed from FIG. 3 for clarity.

In this embodiment, the outlet ports 142A, 142B have conical shaped tips $142A_1$, $142B_1$ to increase the amount of shell air that can be extracted thereby.

Further, the inlet ports 146A, 146B according to this embodiment have tips $146A_1$, $146B_1$ that are angled circumferentially toward one another and are also angled axially in a direction toward the compressor section (not shown in this embodiment) and away from the turbine section (not shown in this embodiment). The inlet ports 146A, 146B according to this embodiment are thus configured such that they inject shell air at least partially in the circumferential direction toward one another and toward the top dead center 134 of the casing wall 132, which is located circumferentially between the first and second inlet ports 146A, 146B as shown in FIG. 3, i.e., the shell air injected by the inlet ports 146A, 146B includes a circumferential velocity component.

After flowing to the top dead center 134 of the casing wall 132, the air injected by the inlet ports 146A, 146B flows from the top wall section 132A of the casing wall 132 down the respective left and right side wall sections 132B, 132C toward the bottom wall section 132D. Since the air injected by the inlet ports 146A, 146B according to this embodiment flows to the top dead center 134 of the casing wall 132, it is believed to be ensured that the shell air at the top dead center 134 of the casing wall 132, which may be the hottest shell air within the combustor shell 120, is circulated with the remaining shell air. Further, since the shell air injected by the inlet ports 146A, 146B according to this embodiment also flows in the axial direction toward the compressor section of the engine 110, i.e., the shell air injected by the inlet ports 146A, 146B includes an axial velocity component, it is believed to be ensured that a greater amount of the shell air within the combustor shell 120 is circulated.

It is noted that the outlet and inlet ports described herein could be located at other axial locations within the casing portion than the locations shown in FIGS. 1-3. Further, multiple rows of outlet and inlet ports may be utilized to further improve shell air circulation within the combustor shell.

It is also noted that if only a single inlet port is used, i.e., as opposed to using first and second inlet ports in the embodiments discussed above, the single inlet port could be configured to inject air down both the left and right side wall sections of the casing wall. Examples of such an inlet port include a dual tipped inlet port, wherein a first tip is directed to the left side wall section and a second tip is directed to the right side wall section, or the inlet port could have louvers or fins that are provide to inject air in the desired directions. Further, such a single inlet port could be located at the top dead center of the casing wall to provide a more efficient air circulation within the combustor shell. Moreover, such a single inlet port could also be configured such that the shell air injected thereby includes an axial velocity component.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A gas turbine engine including a longitudinal axis defining an axial direction of the engine, the engine comprising:
   a compressor section where air pulled into the engine is compressed;
   a combustion section comprising a plurality of combustor apparatuses where, during a first mode of engine operation fuel is mixed with at least a portion of the compressed air from the compressor section and burned to create hot combustion gases;
   a turbine section where, during the first mode of engine operation the hot combustion gases from the combustion section are expanded to extract energy from the combustion gases;
   a casing having a portion disposed about the combustion section, the casing portion comprising a casing wall having a top wall section defining a top dead center, left and right side wall sections, and a bottom wall section defining a bottom dead center, the casing portion further defining an interior volume in which the combustor apparatuses and air compressed by the compressor section are located; and
   a shell air recirculation system comprising:
      at least one outlet port located at the bottom wall section of the casing wall;
      first and second inlet ports located at the top wall section of the casing wall, the inlet ports being circumferentially spaced apart from one another and located at generally the same axial location;
      a piping system that provides fluid communication between the at least one outlet port and the inlet ports;
      a blower for extracting air from the interior volume of the casing portion through the at least one outlet port and for conveying the extracted air to the inlet ports; and
      a valve system that is configured to be:
         closed during the first mode of engine operation to substantially prevent air from passing through the piping system; and
         open during a second mode of engine operation for allowing air to pass through the piping system such that at least a portion of the air in the interior volume of the casing portion is extracted from the at least one outlet port by the blower and conveyed by the blower to the inlet ports for injection into the top wall section of the casing wall, wherein the inlet ports are configured such that the air injected thereby:
            includes a velocity component in the circumferential direction; and
            is injected at least partially in respective directions toward one another and toward the top dead center of the casing wall, the top dead center of the casing wall being located circumferentially between the inlet ports.

2. The gas turbine engine of claim 1, wherein the first mode of engine operation is full load operation.

3. The gas turbine engine of claim 2, wherein the second mode of engine operation is less than full load operation.

4. The gas turbine engine of claim 1, wherein the inlet ports are configured such that the air injected thereby flows from the top wall section of the casing wall down the left and right side wall sections of the casing wall toward the bottom wall section of the casing wall.

5. The gas turbine engine of claim 4, wherein the inlet ports are configured such that the air injected thereby includes a velocity component in the axial direction.

6. The gas turbine engine of claim 1, wherein the at least one outlet port and the inlet ports are also configured to function as steam augmentation pipes to introduce high pressure steam into the interior volume of the casing portion during the first mode of operation.

7. The gas turbine engine of claim 1, wherein the combustion section comprises a can annular combustion section and the plurality of combustor apparatuses comprises an annular array of combustor apparatuses.

8. A gas turbine engine including a longitudinal axis defining an axial direction of the engine, the engine comprising:
   a compressor section where air pulled into the engine is compressed;
   a combustion section comprising a plurality of combustor apparatuses where, during a first mode of engine operation fuel is mixed with at least a portion of the compressed air from the compressor section and burned to create hot combustion gases;
   a turbine section where, during the first mode of engine operation the hot combustion gases from the combustion section are expanded to extract energy from the combustion gases;
   a casing having a portion disposed about the combustion section, the casing portion comprising a casing wall having a top wall section defining a top dead center, left and right side wall sections, and a bottom wall section defining a bottom dead center, the casing portion further defining an interior volume in which the combustor apparatuses and air compressed by the compressor section are located; and
   a shell air recirculation system comprising:

at least one outlet port located at the bottom wall section of the casing wall;

first and second inlet ports located at the top wall section of the casing wall, the first inlet port including an outlet facing in a circumferential direction toward the first sidewall section of the casing wall and the second inlet port including an outlet facing in a circumferential direction toward the second sidewall section of the casing wall such that air injected by the first and second inlet ports flows respectively down both the left and right side wall sections to the bottom wall section of the casing wall;

a piping system that provides fluid communication between the at least one outlet port and the inlet ports;

a blower that is configured to extract air from the interior volume of the casing portion through the at least one outlet port and to convey the extracted air to the inlet ports during the first mode of engine operation; and a valve system that is configured to be:
closed during the first mode of engine operation to substantially prevent air from passing through the piping system; and
open during a second mode of engine operation for allowing air to pass through the piping system such that at least a portion of the air in the interior volume of the casing portion is extracted from the at least one outlet port by the blower and conveyed by the blower to the inlet ports.

9. The gas turbine engine of claim 8, wherein the first mode of engine operation is full load operation and the second mode of engine operation is less than full load operation.

10. The gas turbine engine of claim 9, wherein the combustion section comprises a can annular combustion section and the plurality of combustor apparatuses comprises an annular array of combustor apparatuses.

11. The gas turbine engine of claim 8, wherein the first and second inlet ports are circumferentially spaced apart and located at generally the same axial location, wherein the inlet ports are both configured to inject air in a direction toward one another and toward the top dead center of the casing wall.

12. The gas turbine engine of claim 11, wherein the inlet ports are configured such that the air injected thereby includes a velocity component in the axial direction toward the compressor section and away from the turbine section.

13. The gas turbine engine of claim 8, wherein the at least one outlet port and the inlet ports are also configured to function as steam augmentation pipes to introduce high pressure steam into the interior volume of the casing portion during the first mode of operation.

14. A gas turbine engine including a longitudinal axis defining an axial direction of the engine, the engine comprising:

a compressor section where air pulled into the engine is compressed;

a can annular combustion section comprising an annular array of combustor apparatuses where, during a first mode of engine operation fuel is mixed with at least a portion of the compressed air from the compressor section and burned to create hot combustion gases;

a turbine section where, during the first mode of engine operation the hot combustion gases from the combustion section are expanded to extract energy from the combustion gases;

a casing having a portion disposed about the combustion section, the casing portion comprising a casing wall having a top wall section defining a top dead center, left and right side wall sections, and a bottom wall section defining a bottom dead center, the casing portion further defining an interior volume in which the combustor apparatuses and air compressed by the compressor section are located; and a shell air recirculation system comprising:
at least one outlet port located at the bottom wall section of the casing wall;

first and second inlet ports located at the top wall section of the casing wall, the inlet ports being circumferentially spaced apart from one another and located at generally the same axial location, at least one of the outlet and inlet ports also being configured to function as a steam augmentation pipe to introduce high pressure steam into the interior volume of the casing portion during a first mode of operation;

a piping system that provides fluid communication between the at least one outlet port and the inlet ports;

a blower that is configured to extract air from the interior volume of the casing portion through the at least one outlet port and for conveying the extracted air to the inlet ports during the first mode of engine operation; and a valve system that is configured to be:
closed during the first mode of engine operation to substantially prevent air from passing through the piping system; and
open during a second mode of engine operation for allowing air to pass through the piping system such that at least a portion of the air in the interior volume of the casing portion is extracted from the at least one outlet port by the blower and conveyed by the blower to the inlet ports for injection into the top section of the casing wall, wherein the inlet ports are configured to inject air in opposing circumferential directions such that the air injected thereby flows down both the left and right side wall sections to the bottom wall section of the casing wall.

15. The gas turbine engine of claim 14, wherein each of the outlet and inlet ports are also configured to function as a steam augmentation pipe to introduce high pressure steam into the interior volume of the casing portion during the first mode of operation.

16. The gas turbine engine of claim 14, wherein the first inlet port is located near the left side wall section of the casing wall and the second inlet port is located near the right side wall section of the casing wall.

17. The gas turbine engine of claim 16, wherein the inlet ports are configured such that the air injected thereby is injected at least partially in respective directions toward one another and toward the top dead center of the casing wall, the top dead center of the casing wall being located circumferentially between the inlet ports.

18. The gas turbine engine of claim 17, wherein the inlet ports are configured such that the air injected thereby includes a velocity component in the axial direction.

* * * * *